No. 860,570. PATENTED JULY 16, 1907.
H. REMMERS.
POTATO PLANTER.
APPLICATION FILED JAN. 12, 1907.
3 SHEETS—SHEET 1.
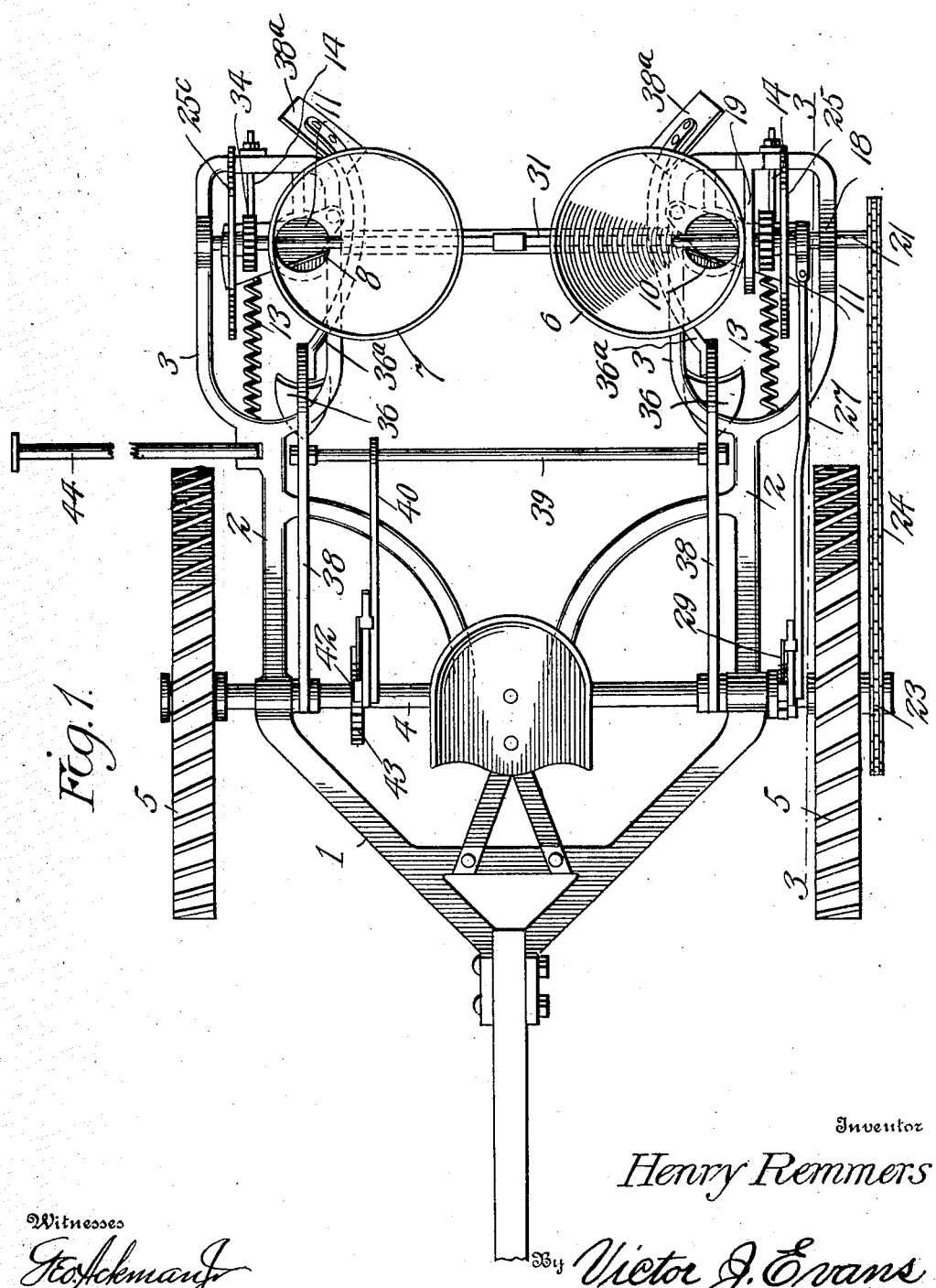
Witnesses
Geo. Ackman Jr.
C. C. Hines.
Inventor
Henry Remmers
By Victor J. Evans
Attorney

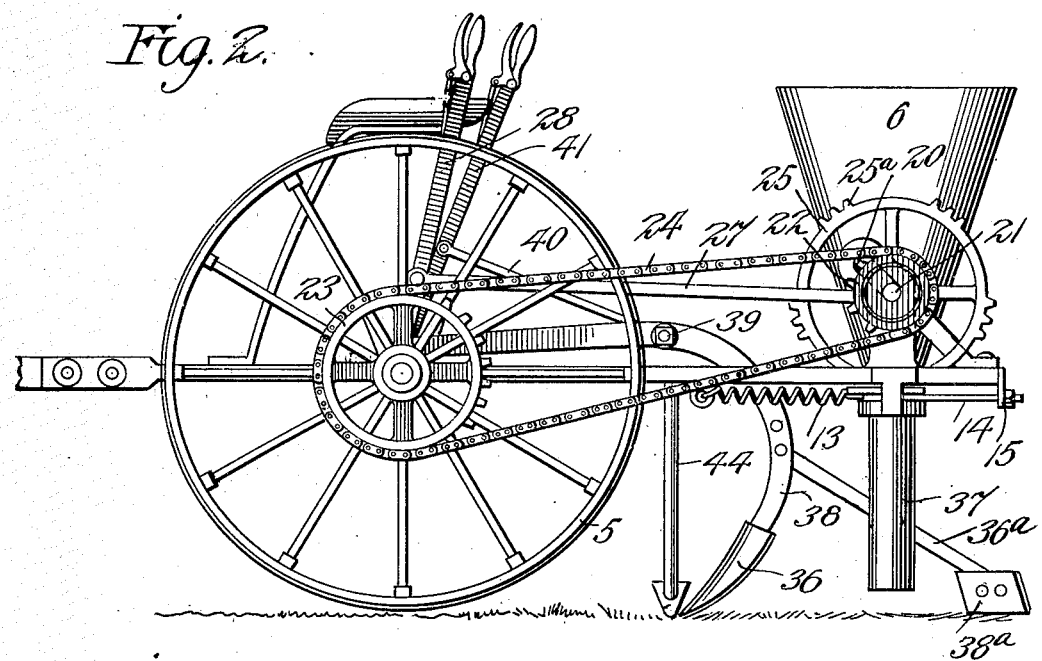
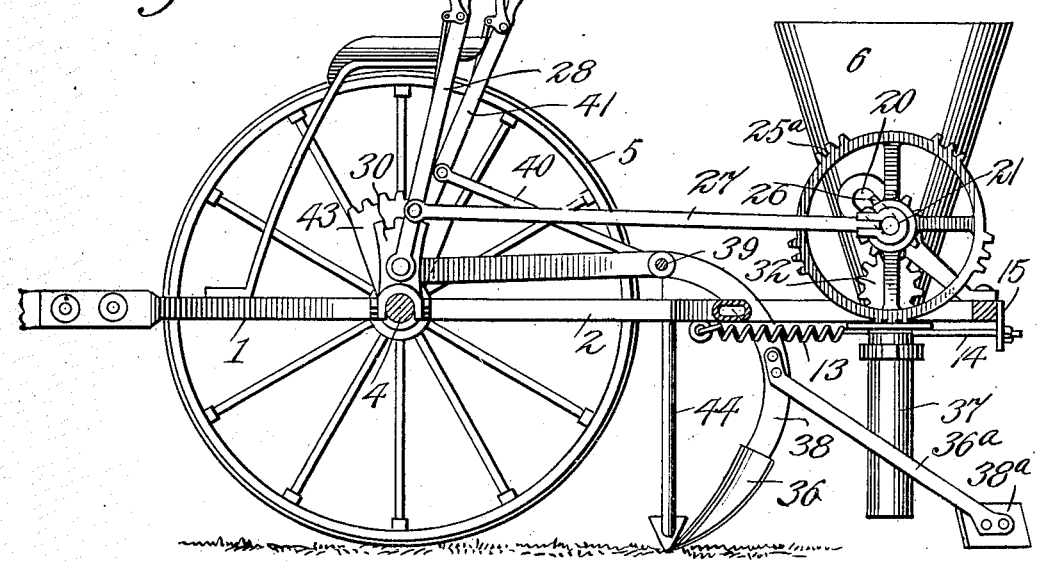

No. 860,570. PATENTED JULY 16, 1907.
H. REMMERS.
POTATO PLANTER.
APPLICATION FILED JAN. 12, 1907.
3 SHEETS—SHEET 3.
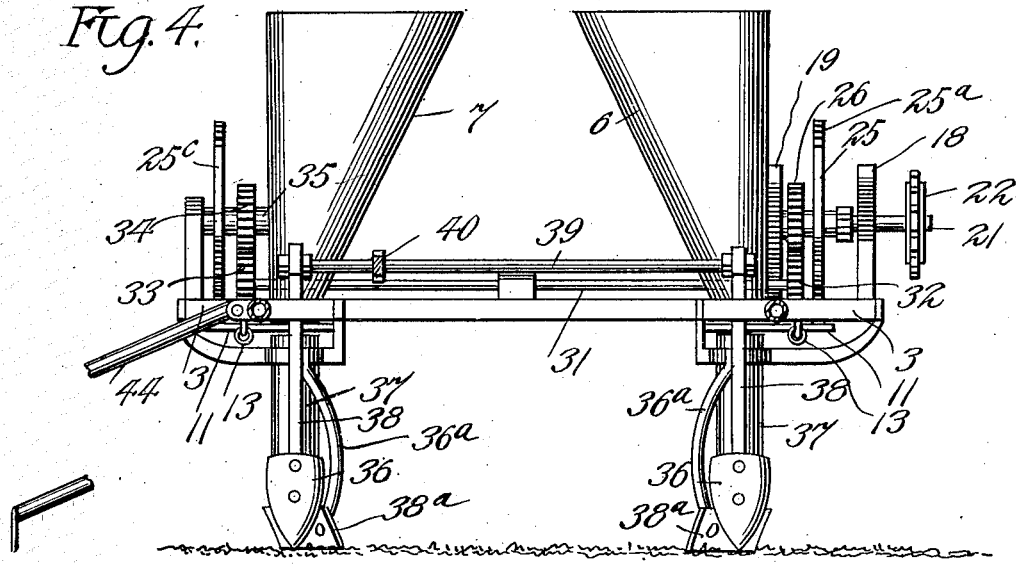
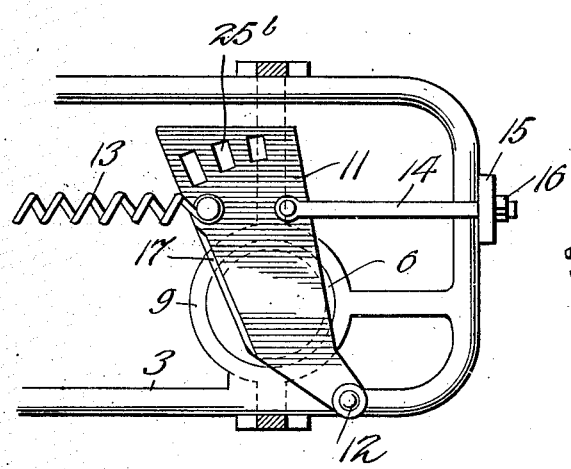
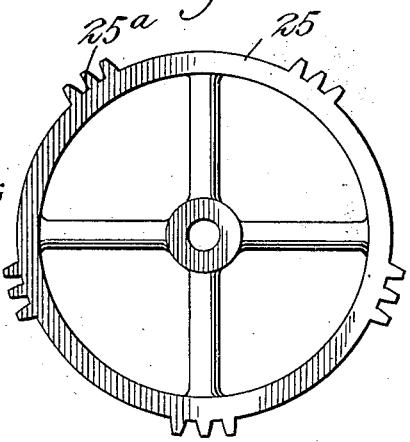
Inventor
Henry Remmers,
Witnesses
By Victor J. Evans
Attorney

UNITED STATES PATENT OFFICE.

HENRY REMMERS, OF OMAHA, NEBRASKA.

POTATO-PLANTER.

No. 860,570.     Specification of Letters Patent.     Patented July 16, 1907.

Application filed January 12, 1907. Serial No. 351,994.

*To all whom it may concern:*

Be it known that I, HENRY REMMERS, a citizen of the United States of America, residing at Omaha, in the county of Douglas and State of Nebraska, have invented new and useful Improvements in Potato-Planters, of which the following is a specification.

This invention relates to potato planters, and has for its object to provide an improved construction of planting apparatus embodying novel means for cutting and dropping the potatoes and throwing the drive gearing into and out of action.

In the accompanying drawings,—Figure 1 is a top plan view of a potato planter embodying my invention. Fig. 2 is a side elevation of the same. Fig. 3 is a vertical longitudinal section on line 3—3 of Fig. 1. Fig. 4 is a rear elevation of the planter. Fig. 5 is a top plan view of one of the hopper supporting portions of the frame, the hopper being removed, showing the oscillating dropper plate. Fig. 6 is a side view of the mutilated gear for periodically operating the dropper plate.

Referring to the drawings, the numeral 1 designates the frame of the implement, having suitably connected side beams 2 terminating at their rear ends in looped supporting portions 3 upon which the hoppers and dropping mechanism are mounted, as hereinafter described.

Journaled upon the front portion of the frame is a transverse main driving shaft or axle 4, carrying ground wheels 5, which impart motion thereto as the implement travels over the ground. Hoppers 6 and 7 are arranged at the rear of the frame to contain potatoes which are to be planted simultaneously in two parallel rows. These hoppers preferably taper to a narrow outlet 8 at their lower ends, and each hopper rests upon a supporting ring 9 formed or provided upon its supporting frame portion 3. At the lower end of the hopper is arranged a stationary cutting knife 10 below the outlet 8 and extending at one side across the same. An oscillating dropper plate 11 is pivotally mounted at one end upon the portion 3, as indicated at 12, and extends inwardly across the ring 9 and below the outlet 8 and is movable across said outlet to operate as a valve to regulate the dropping of the potatoes.

The plate is normally maintained in cut-off position by a spring 13, connected thereto and to the front part of the frame portion 3, and is guided in its movements by a rod or link 14, the forward end of which is pivoted to said plate, while the rear end moves in a guide 15 and carries a stop nut 16 to limit the forward movement of the plate under the pull of the spring.

The forward edge of the plate is arranged at an oblique angle to the frame and beveled to form a cutting edge 17, thus adapting it to serve as a cutting knife in conjunction with the stationary knife 10 to sever into pieces potatoes or portions of potatoes which are too large to pass through the outlet 8.

Bearing brackets 18 and 19 are provided upon one of the looped portions 3, preferably the one at the left of the frame, and these brackets incline upwardly and forwardly and are formed with bearing slots 20 for a transverse power transmitting shaft 21, which shaft carries a sprocket pinion 22 connected with a sprocket wheel 23 on the main drive shaft 4 by a drive chain 24. The shaft 21 also carries a mutilated gear wheel 25 and a spur gear 26, the said mutilated gear being provided at spaced intervals with sets of teeth $25^a$ to engage teeth or slots $25^b$ formed upon or in the inner end of the dropper plate 11, whereby the latter will be moved rearwardly against the resistance of the spring 13 to dropping position, said plate being alternately moved at regular intervals to open and close the outlet 8 by the action of the gear and spring.

By this construction it will be seen that the potatoes will be periodically dropped from the hopper, and that the cutting knives will operate to sever into pieces those potatoes or portions of potatoes which are too large to pass through the outlet, thus preventing the latter from becoming clogged and interfering with the operation of the machine. The shaft 21 is connected by a rod or link 27 with an adjusting lever 28 pivoted on the shaft 4, whereby said shaft 21 may be moved up and down in the bearing slots 20 to throw the mutilated gear out of or into operative position to stop the dropper mechanism or throw it into action, the lever being provided with the usual pawl 29 to engage a rack 30 for locking it in its adjusted positions.

A second transverse shaft 31 is journaled on the frame and is provided at one end with a spur gear 32 adapted to mesh with the gear 26, and has at its opposite end a spur gear 33 meshing with a gear 34 on the drive shaft 35 of the dropper mechanism at the opposite side of the frame, which shaft also carries a spur gear $25^c$ similar in construction to gear 25 to operate the dropper plate controlling the discharge of potatoes from the hopper 7. The gear 26 is thrown into and out of mesh with the gear 32 by the movements of the shaft 21 in the bearing slots 20, so that the dropper mechanism of both hoppers may be simultaneously thrown into and out of operation.

Shovels 36 are provided in advance of discharge tubes 37, through which the potatoes pass from the hoppers to the ground, to form the furrows in which the potatoes are deposited. These shovels are carried by beams 38 pivotally mounted at their forward ends on the shaft 4 and connected for movement in unison by a rod 39. A link 40 connects said rod with an adjusting lever 41 on the shaft 4, by which the shovels may be raised and lowered so as to be thrown out of operation or depressed to form a furrow of the desired depth. The lever carries a pawl 42 to engage a rack 43, by which it may be locked in any of its adjusted positions. Rods or bars 36ª are attached to and extend rearwardly from the beams 38 and carry covering blades or shovels 38ª, arranged to follow the shovels 36 to cover the deposited potatoes.

A marker 44 may be pivotally mounted upon the frame for marking off the ground to indicate the distance between rows. This may be of any preferred construction and any suitable means may be provided for raising and lowering the same.

Having thus described the invention, what is claimed as new, is:—

1. In a potato planter, a supporting frame, a hopper mounted thereon and provided with a discharge outlet, a stationary knife located adjacent the outlet, an oscillating dropper controlling the outlet and having a cutting edge to coöperate with said knife, and means for actuating the dropper.

2. In a potato planter, a supporting frame, a hopper mounted thereon and provided with a discharge outlet, a stationary knife located adjacent the outlet, an oscillatory dropper controlling the outlet and having a cutting edge to coöperate with the knife, gearing for intermittently swinging said dropper to discharge position, and automatic means for guiding and returning the dropper to normal position.

3. In a potato planter, a hopper having an outlet, a swinging dropper plate controlling said outlet, a mutilated gear adapted to periodically mesh with the dropper to move the same to discharging position, and means for automatically returning the dropper.

4. In a potato planter, a hopper having an outlet, a swinging dropper plate pivoted at one end and provided with an arcuate row of teeth at its free end, a mutilated gear adapted to periodically mesh with said teeth to swing said plate to discharging position, and means for automatically returning the plate to normal position after each operation.

5. In a potato planter, a hopper having an outlet, a stationary knife located adjacent the outlet, a dropper plate arranged below the outlet, said plate being pivoted at one end, provided with teeth at its opposite end and formed with a cutting edge to coöperate with said knife, a mutilated gear for periodically engaging said teeth, means for driving the gear, and means for returning the plate to normal position.

6. In a potato planter, a hopper having an outlet, a swinging dropper at the bottom of the outlet provided with gear teeth, a mutilated gear having spaced series of teeth to engage said gear teeth and move the dropper to dropping position, means for retracting the dropper, and means for adjusting the gear into and out of operating position.

7. In a potato planter, a hopper having a discharge outlet, an oscillating dropper plate controlling said outlet, said plate being provided with gear teeth, a shaft adjustably mounted in bearings adjacent the hopper, a spur gear driven by said shaft and adapted to mesh with the teeth of the plate to periodically swing said plate to dropping position, means for automatically returning the plate to normal position, means for driving said shaft, and means for adjusting the shaft to throw the mutilated gear into and out of operative relation to the dropper.

8. In a potato planter, a supporting frame, hoppers mounted thereon in alinement with each other, each hopper having an outlet, swinging dropper plates controlling said outlet and provided with gear teeth, shafts disposed adjacent the hoppers and carrying mutilated gears adapted to mesh with the teeth of the dropper plate to periodically swing said plate to dropping position, one of said shafts being adjustable to throw the mutilated gear thereon into and out of operative relation to the dropper plate driven thereby, means for returning the droppers to normal position after actuation, gears on the dropper operating shafts, an intermediate shaft having gears meshing with said gears, whereby motion will be transmitted from the adjustable dropper operating shaft to its companion shaft and the adjustability of said shafts will throw both sets of gearing into and out of operation, means for driving the adjustable shaft, and means for adjusting the same.

In testimony whereof, I affix my signature in presence of two witnesses.

HENRY REMMERS.

Witnesses:
CORLISS F. HOPPER,
O. T. HAMER.